United States Patent
Dieckmann et al.

(10) Patent No.: US 9,834,261 B2
(45) Date of Patent: Dec. 5, 2017

(54) REAR SPOILER DEVICE FOR A VEHICLE

(71) Applicant: WABCO Europe BVBA, Brussels (BE)

(72) Inventors: Thomas Dieckmann, Pattensen (DE); Jakob Tobias Krost, Braunschweig (DE); Josef Oleksik, Braunschweig (DE); Timo Richter, Braunschweig (DE); Gandert Van Raemdonck, Delft (NL); Frank Zielke, Barsinghausen (DE)

(73) Assignee: WABCO Europe BVBA, Brussels (BE)

( * ) Notice: Subject to any disclaimer, the term of this patent is extended or adjusted under 35 U.S.C. 154(b) by 69 days.

(21) Appl. No.: 14/901,840

(22) PCT Filed: May 24, 2014

(86) PCT No.: PCT/EP2014/001407
§ 371 (c)(1),
(2) Date: Dec. 29, 2015

(87) PCT Pub. No.: WO2015/000538
PCT Pub. Date: Jan. 8, 2015

(65) Prior Publication Data
US 2016/0347380 A1    Dec. 1, 2016

(30) Foreign Application Priority Data

Jul. 4, 2013 (DE) .................. 10 2013 011 169

(51) Int. Cl.
*B62D 35/00* (2006.01)

(52) U.S. Cl.
CPC .......... *B62D 35/001* (2013.01); *B62D 35/007* (2013.01)

(58) Field of Classification Search
CPC ....................... B62D 35/001; B62D 35/007
(Continued)

(56) References Cited

U.S. PATENT DOCUMENTS

| 4,749,220 A | 6/1988 | Adams et al. |
| 8,136,868 B2 | 3/2012 | Nusbaum |

(Continued)

FOREIGN PATENT DOCUMENTS

| DE | 19524825 A1 | 1/1997 |
| DE | 29909639 U1 | 8/1999 |

(Continued)

OTHER PUBLICATIONS

European Patent Office, Rijswijk, Netherlands, International Search Report of International Application No. PCT/EP2014/001407, dated Aug. 19, 2014, 2 pages.

*Primary Examiner* — Jason S Morrow
*Assistant Examiner* — E Turner Hicks
(74) *Attorney, Agent, or Firm* — Brinks Gilson & Lione (57) ABSTRACT

A vehicle (1) includes at least one rear door (6, 8) with a rear spoiler device (14). The rear spoiler device includes an air deflector element (15, 25, 35, 45), which is adjustable between a basic position and a drive position for extending the contour and aerodynamic air deflection. The rear spoiler device further includes one support device (18, 28, 38, 48) for supporting the air deflector element (15, 25, 35, 45) in its drive position. The support device has a four-bar linkage (18, 28, 38, 48) with at least four joints or joint axes (A, B, C, D) for adjusting the air deflector element (15, 25, 35, 45) between the basic position and the drive position.

17 Claims, 7 Drawing Sheets

(58) Field of Classification Search
USPC ............................... 296/180.4, 180.5, 180.3
See application file for complete search history.

(56) References Cited

U.S. PATENT DOCUMENTS

| | | | | |
|---|---|---|---|---|
| 2008/0048468 A1* | 2/2008 | Holubar | ............... | B62D 35/001 296/180.4 |
| 2012/0223544 A1* | 9/2012 | Benton | ................ | B62D 35/001 296/180.1 |
| 2013/0106136 A1* | 5/2013 | Smith | .................. | B62D 35/001 296/180.4 |
| 2016/0332680 A1* | 11/2016 | Dieckmann | .......... | B62D 35/001 |

FOREIGN PATENT DOCUMENTS

| | | |
|---|---|---|
| DE | 10222082 A1 | 11/2003 |
| DE | 10228658 A1 | 1/2004 |
| DE | 10 2004 045 382 A1 | 3/2006 |
| DE | 10 2006 053 150 A1 | 5/2008 |
| DE | 20 2009 015 009 U1 | 1/2010 |
| DE | 20 2009 014 476 U1 | 2/2010 |
| DE | 20 2009 014 510 U1 | 2/2010 |
| DE | 10 2008 053 770 A1 | 4/2010 |
| DE | 10 2009 014 860 A1 | 10/2010 |
| EP | 0 298 205 A1 | 1/1989 |
| EP | 0 685 385 A1 | 12/1995 |
| EP | 1 601 568 A1 | 12/2005 |
| EP | 2 098 441 A2 | 9/2009 |
| EP | 2 500 244 A1 | 9/2012 |
| WO | 2005/058677 A1 | 6/2005 |

* cited by examiner

REAR SPOILER DEVICE FOR A VEHICLE

TECHNICAL FIELD OF THE INVENTION

The invention relates to a rear spoiler device for a vehicle, in particular a commercial vehicle, for example a truck, wherein the vehicle comprises at least one rear door, in particular two rear doors. The rear spoiler device is particularly suitable for a vehicle having a substantially box-section construction and side walls, roof and rear doors closing these off at right angles to the rear.

BACKGROUND OF THE INVENTION

DE 10 2009 014 860 A1 shows such a rear spoiler device. It comprises air deflector elements for extending the contour and aerodynamic air deflection of the side walls and the roof, which in a basic position are folded in towards the rear doors and in the drive position or position of use are erected or deployed and in this case are supported on mountings on a vehicle rear edge. Such rear spoilers serve to improve the aerodynamics of the vehicle and are capable of reducing the fuel consumption accordingly.

DE 20 2009 014 476 U1, DE 20 2009 014 510 U1 and DE 20 2009 015 009 U1 show further rear spoiler devices, in which the air deflector elements or spoiler elements are displaceably or pivotally arranged in order to afford unimpeded opening of the rear doors.

Rear spoilers which are attached to rear door hinges are also known. DE 102 28 658 A1 shows various folding solutions, in which plane surfaces pivoted on a hinge are intended to afford an optimized aerodynamic performance in driving mode.

Such attachments of the air deflector elements in the hinge area are generally complicated, however, and limited to special forms of hinge. Furthermore, the feasible air deflector elements are generally limited in their length. When opening the rear doors forwards by 270°, more complex rear spoiler constructions can often impede the opening operation, particularly when used in the hinge area.

Furthermore, the operating process for the adjustment operation from the basic position into the driving position and also for the reverse adjustment is generally intricate. In addition, complex arresting mechanisms often have to be provided, in order to ensure sufficient stability of the various air flows and air turbulence.

U.S. Pat. No. 8,136,868 B2 shows a rear spoiler system for a vehicle, which instead of pivoted rear doors comprises a roller-type cover. Here an adjustment of the spoiler is provided by four articulated joints, which are provided on the roof and on a vehicle rear structure.

Adjustable airfoils are also known, for example on automobiles, but these are intended for an airflow to both sides. DE 10222082 A1, DE 29909639 U1, DE 102004045382 A1, DE 102008053770 A1, DE 102006053150 A1, EP 0298205 B1, EP 0685385 B1, EP 1601568 B1, EP 2098441 B1, U.S. Pat. No. 4,749,220 A1 and WO 2005058677 A1 show further systems.

These systems are cited here are firstly of fairly complex construction and secondly are awkward to adjust. Furthermore, the functionality of the vehicle, in particular its ease of access, are to some extent restricted.

SUMMARY OF THE INVENTION

The object of the invention is to create a rear spoiler device which can be constructed with relatively little outlay and which allows a reliable adjustment between its drive position and its basic position.

A four-bar linkage or four-bar linkage device is therefore provided for adjusting the air deflector element between its basic position and its drive position. The four-bar linkage is preferably provided exclusively between the rear door and the air deflector element.

The four-bar linkage advantageously comprises precisely four joints, that is to say four joint axes. This allows the air deflector element to be positively guided between its basic position and its drive position, that is to say a definite guidance with no additional degree of freedom. The four joints or joint axes of the four-bar linkage may also each be formed by multiple joints arranged in the same joint axis, for example by two joints arranged in one joint axis or two oscillating links which each have two or more joints, for example, but which are all arranged in the common joint axis.

Here the four-bar linkage comprises, in particular, at least one main oscillating link of greater length and at least one secondary oscillating link of smaller length.

A reliable and definite guidance of the air deflector element is therefore allowed between its stowed or folded basic position and the deployed drive position for extending the contour. The definite kinematic guidance or positive guidance of the four-bar linkage affords a reliable, defined adjustment operation with no operating error and avoids ambiguous adjustments with further degrees of freedom, which may not be apparent to the user. The adjustment is furthermore easy for the user to perform; it can be performed with one hand, for example.

The positive guidance may be assisted by the action of a spring. In particular, the spring loading of the respective air deflector element may be of bistable design, for example, and may therefore act in each position: in the basic position and in the drive position. Starting from the basic position the user therefore first pushes the air deflector element in a first swivel range against the action of the spring as far as an interim dead-point position, from which, in a second swivel range, an automatic or at least spring-assisted opening operation ensues into the drive position, and inversely back from the drive position into the basic position. This makes it possible to prevent adjustment errors and facilitates the operating process.

Thus a rear spoiler device having one or two side spoiler devices and one or two roof spoiler devices may be adjusted successively, by first erecting the side spoiler devices, for example, and then adjusting the roof spoiler devices, for example by way of an operating means such as an operating rod.

The side deflector surfaces may be arrested, for example, by means of hinged shackles, for example on the secondary oscillating links, in particular both in the drive position an in the basic position.

In the folded basic position, the side air deflector element, for example, may be laid on the folded-down roof air deflector element, so as to allow a flat and compact seating on the rear door.

The entire rear spoiler device can be fitted just to at least the one rear door, that is to say without additional attachments to a vehicle frame or a vehicle structure. The entire rear spoiler device can be advantageously fitted to just one external face of the rear door. In the case of a vehicle having two rear doors opening outwards it is therefore possible to fit a rear spoiler device having a left-hand and a right-hand side spoiler device and a roof spoiler device to the two rear doors, for example just to their external faces, that is to say without needing an upper edge of the rear doors, for example; something which is not possible in the case of refrigerated semitrailers, for instance.

A universal arrangement is therefore provided. In the basic position both the side air deflector element and the roof air deflector element are advantageously swiveled out of the door hinge area, so as to afford a maximum opening angle of the rear door and not to impede the opening of at least the one rear door forwards by approximately 270°. The rear door can therefore be swiveled from its closed position all the way forwards by approximately 270°, the folded rear spoiler device resting flat against the rear door or both rear doors and therefore being accommodated between the rear door and the side wall. This opening operation is therefore assisted by the fact that according to the invention no intricate, complex attachments are required in the hinge area, which get in the way when opening the rear door and impede large opening angles.

The kinematics of the four-bar linkage allow an opening operation in which the respective air deflector element is first swiveled slightly rearwards away from the rear door and is then swiveled with its front end towards the respective edge, that is to say the edge between the side wall and the rear area or the roof and the rear area. These kinematics of the four-bar linkage have distinct advantages compared to a simple swiveling operation about a single center of rotation. Thus, in the drive position, for example, it is also possible to extend the deflector surface of the air deflector element forwards, that is to say beyond the rear surface, for example to the side of the vehicle structure or the side wall, in order to cover an intermediate gap between the air deflector element and the vehicle structure or the side wall. This allows a distinct improvement in the aerodynamics and makes it possible to reduce the air resistance significantly and also, for example, to prevent unwanted wind noises in the gap.

In principle, a partial opening of the rear doors is also possible in the drive position, for example by 90°, since the parts of the rear spoiler device also swivel. The is possible particularly in an embodiment without extension of the deflector surfaces.

The attachment to the rear door can be made simply from the outside or from the rear, without having to fit further elements in upper edges of the rear door, for example. The air deflector elements may connect to the vehicle surfaces, that is to say the side wall or the roof, by positive interlock.

The positive guidance afforded by the four-bar linkage also allows the use of less rigid air deflector elements, since deformations in the erection kinematics can be prevented. The four-bar linkage furthermore also permits a rigid attachment in all positions, without the parts rattling or vibrating, for example.

The attachment to the rear door alone also affords the facility for retrofitting; the rear spoiler device can also be fitted to refrigerated semitrailers and other commercial vehicles, for example. In the basic position and in the drive position it is possible to run through vehicle washers without damaging the rear spoiler device.

In the basic folded state, the oscillating links advantageously rest directly on the rear door and the respective air deflector element on the oscillating links, at least in some areas. The side air deflector element preferably rests on the roof air deflector element.

Since the side spoiler device comprises four vertically running joint axes for extending the contour of the side wall of the vehicle, the side air deflector element is preferably oriented vertically in any swivel position. Accordingly, the roof spoiler device may comprise just four horizontally running joint axes for extending the contour of the roof, so that in each case the roof air deflector element runs horizontally. This therefore provides clear amounts of swiveling travel and definite orientations; the individual parts do not pivot or tilt in more complex swivel paths, which might cause injuries to the user.

The additional means required, that is to say the oscillating links and the joints, are of relative simple design and can be formed, for example, as metal plates and conventional joints. In principle, the same components, which when fitting on the left-hand and right-hand side are each transposed by 180° or switched top and bottom, for example, can be used for the left-hand and right-hand form.

BRIEF DESCRIPTION OF THE DRAWINGS

The invention is explained in more detail below on the basis of some embodiments with reference to the drawings attached, of which:

FIG. 4 shows the rear area with the left-hand side deflector surface fully erected and other deflector surfaces folded in;

DETAILED DESCRIPTION OF THE DRAWINGS

The drawings are provided herewith for purely illustrative purposes and are not intended to limit the scope of the present invention.

Figure 1:
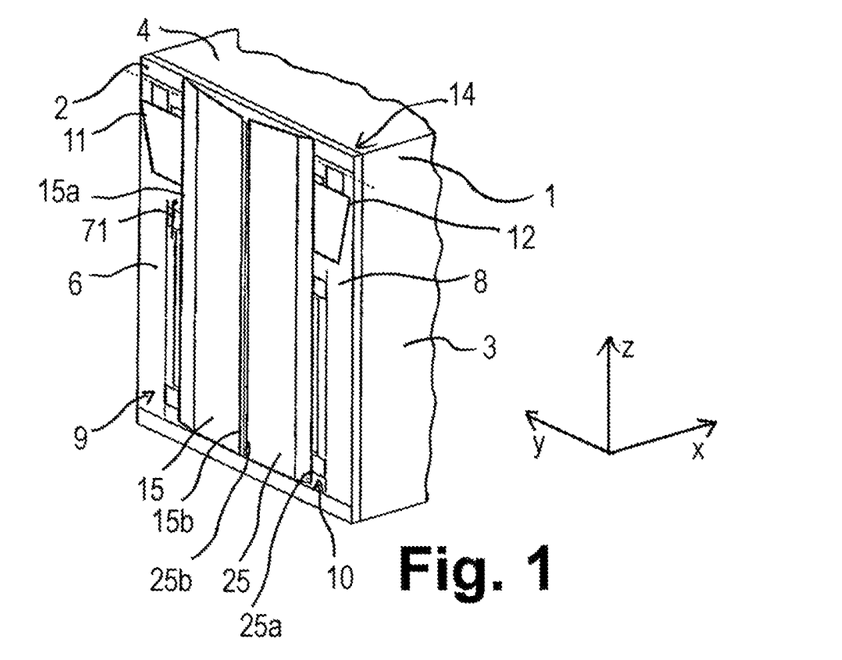
FIG. 1 shows a rear area of a vehicle having a rear spoiler device according to one embodiment of the invention in a basic position.

FIG. 1 shows a rear area of a vehicle 1, in particular a commercial vehicle 1 or a truck having a vehicle structure 2, which here, in particular, represents a vehicle frame or vehicle rear doorway, side walls 3, a roof 4 and a (in the direction of travel) left-hand rear door 6, together with a right-hand rear door 8. Fixed to the left-hand rear door 6 are a left-hand side spoiler device 9 and a left-hand roof spoiler device 11, which are each adjustable between a folded basic position and an opened-out or deployed drive position; correspondingly attached to the right-hand rear door 8 are a right-hand side spoiler device 10 and a right-hand roof spoiler device 12, which are adjustable between a folded basic position and an opened-out or deployed drive position. The two side spoiler devices 9, 10 and the two roof spoiler devices 11, 12 together form a rear spoiler device 14, which is therefore adjustable between a basic position shown in FIG. 1 and a drive position shown in FIG. 7 in order to extend the contour.

The left-hand side spoiler device 9 comprises a left-hand side air deflector element 15, a main oscillating link 16 and at least one secondary oscillating link 17, which are each pivotally attached between the left-hand rear door 6 and the side air deflector element 15. The main oscillating link 16 is therefore pivotally attached by one end in a front joint 16a in a joint axis A to the left-hand rear door 6, and by its other end via a rear joint 16b in a joint axis C to the left-hand side air deflector element 15. The longitudinal extent or first length L1 of the left-hand side air deflector element 15 is therefore defined by the distance between its joints 16a, 16b and therefore the joint axes A and C. Instead of a main oscillating link 16, two main oscillating links 16 could also be provided, one above the other, that is to say with aligning front joints 16a and aligning rear joints 16b; what matters is that in each case a front joint axis A and a rear joint axis C are formed.

At least the one secondary oscillating link 17 is correspondingly pivotally attached in a front joint 17a in a front joint axis B to the left-hand rear door 6, and a rear joint 17b in a rear joint axis D to the side air deflector element 15. In the embodiment shown two secondary oscillating links 17 are provided one vertical above the other with aligning joints 17a in the common front joint axis B and aligning joints 17b in a common rear joint axis D; in principle is also possible to provide just a single secondary oscillating link. The longitudinal extent of the secondary oscillating link 17 is therefore defined by the distance between its joints 17a and 17b, that is to say the joint axes B and D, and is drawn in as L2. Here L1>L2, that is to say the main oscillating link 16 is longer than at least the one secondary oscillating link 17.

Furthermore, the joint axes A and B are offset in relation to one another in the transverse or Y-direction on the left-hand rear door 6; accordingly, the rear joint axes C and D are also offset in relation to one another in the transverse or Y-direction on the side air deflector element 15. The joint axes B and D of the secondary oscillating link 17 are advantageously provided further outwards in the Y-direction or transverse direction, that is to say towards the left-hand side wall 3, than the joint axes A and C of the main oscillating link 16. The oscillating links 16, 17 with their joints 16a, 16b, 17a, 17b and the joint axes A, B, C, D therefore form a four-bar linkage 18 between the left-hand rear door 6 and the left-hand side air deflector element 15, which therefore ensures a positive guidance between the basic position shown in FIG. 1 and the drive position shown in FIGS. 4 to 9. This can also be seen, in particular, from the top views of the right-hand side spoiler device 10 in FIGS. 10 to 12, in which the same joint axis designations A, B, C, D are used. There follows a detailed description of how the joints are formed:

In the basic position in FIG. 1 the side air deflector element 15 lies substantially parallel to the left-hand rear door 6, the two oscillating links 16 and 17 likewise running substantially parallel and therefore being accommodated flat between the rear door 6 and the side air deflector element 15. For the unimpeded folding movement, the two secondary oscillating links 17 are therefore also offset in the vertical or Z-direction somewhat towards the main oscillating link 16, in particular, as shown, in that one secondary oscillating link 17 is provided above and the other secondary oscillating link 17 below the main oscillating link 16, so that all folding and swivel movements can be performed without the main oscillating link 16 and the two secondary oscillating links 17 interfering with one another.

In the basic position in FIG. 1, therefore, the two left-hand oscillating links 16 and 17 are swiveled inwards in such a way that their rear joints 16b and 17b are swiveled away towards the center, that is to say from the left-hand side wall 3, so that the front joint 16a is located further outwards than the rear joint 16b and the front joint 16a is accordingly located further outwards in the transverse or Y-direction than the rear joint 17b. In this basic position the left-hand side air deflector element 15 lies flat on the oscillating links 16, 17 and therefore substantially parallel to the closed left-hand rear door 6.

Figure 2:
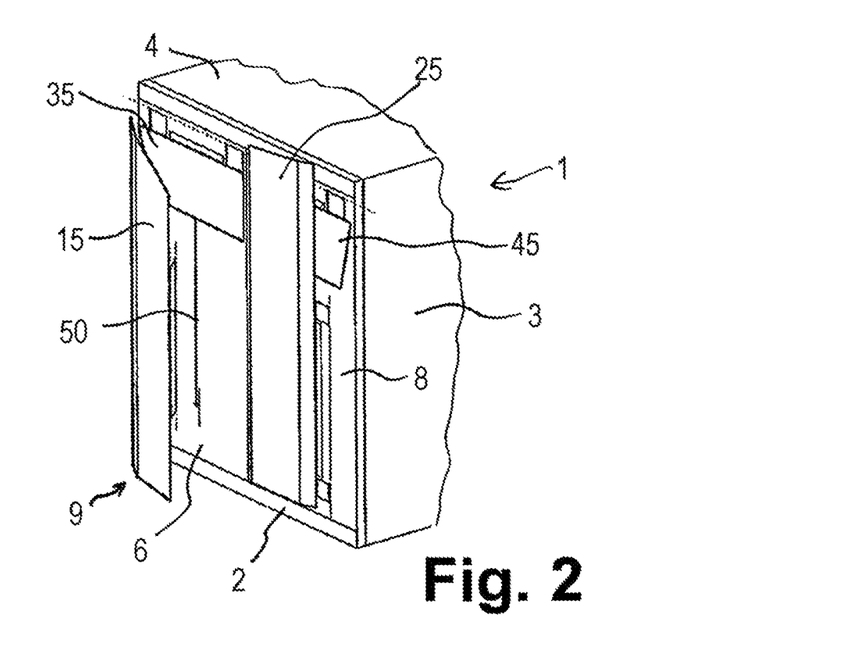
FIG. 2 shows a first intermediate step in erecting the left-hand side deflector surface.
Figure 3:
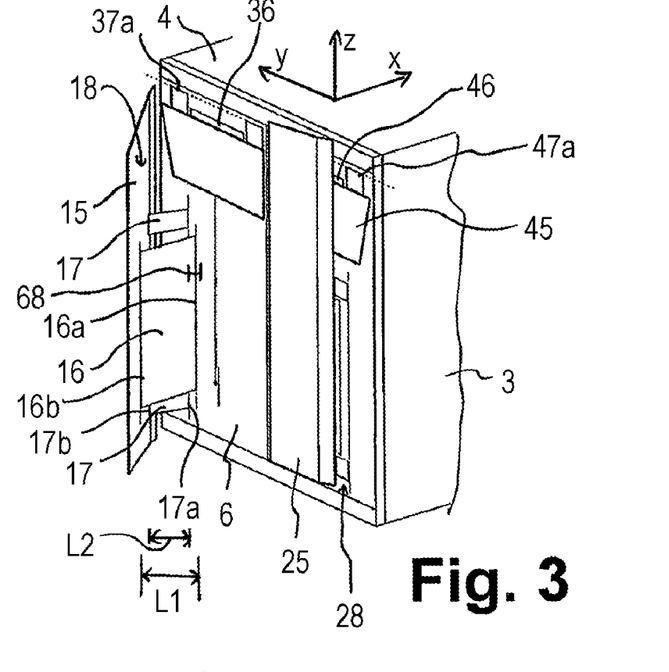
FIG. 3 shows a second intermediate step, following FIG. 2, in the erecting movement of the left-hand side deflector surface.

A bistable spring device 68 is advantageously provided, which each time pushes the four-bar linkage 18 either into the basic position or into the drive position, for example with a dead-point position in the position in FIG. 2 or 3.

In addition, the basic position may be arrested, for example by the arresting mechanism 71 drawn in FIG. 1, which may be fitted, for example in the form of a pivoted shackle, to the rear door 6, for example by the bearing support of the front joint 17a, in order to arrest the secondary oscillating link 17 which rests flat.

Figure 12:
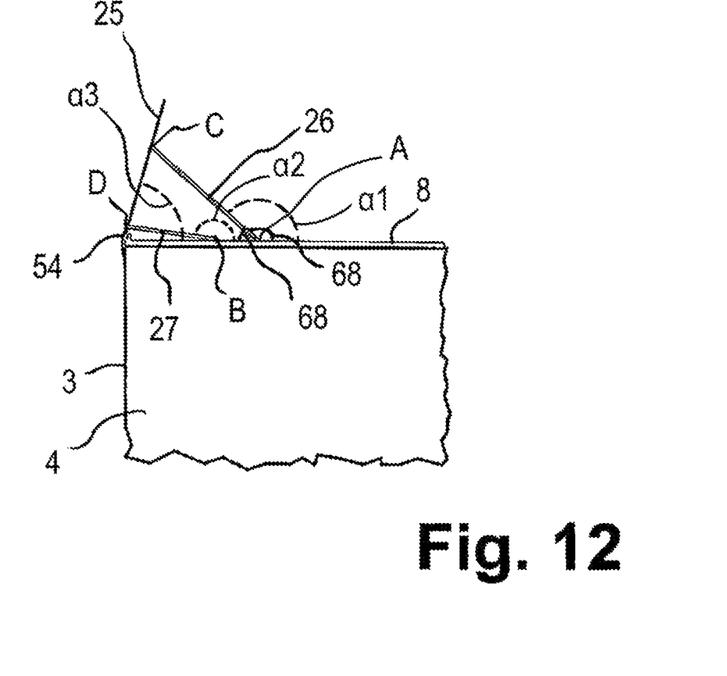
FIG. 12 shows a top view of the drive position of the right-hand side deflector surface.

Starting from FIG. 1, the adjustment into the drive position is performed by swiveling the left-hand side air deflector element 15 rearwards, FIGS. 2 and 3 showing intermediate positions (serving no particular function) purely by way of example: in the first intermediate position in FIG. 2 with a deploying movement of approximately 40%, therefore, the left-hand side air deflector element 15 is distanced rearwards from the rear door 6, a front end 15a of the left-hand side air deflector element 15 performing a slight swiveling movement or a swiveling movement of smaller radius than the rear end 15b, due to the shorter second length L2 of the secondary oscillating link 17 pivotally attached further outwards (in the Y-direction). The side air deflector element 15 therefore passes via the second intermediate position in FIG. 3 into the fully erected or unfolded drive position in FIG. 4, in which the two secondary oscillating links 17 advantageously again rest flat on the left-hand rear door 6; the secondary oscillating links 17 therefore advantageously perform a swiveling movement with a swivel angle $\alpha 2 = 180°$. The main oscillating link 16, on the other hand, performs a smaller swiveling movement with a swivel angle $\alpha 1 < \alpha 2$, for example an angle $\alpha 1$ of between 90° and 180°, so that the rear end 15b of the left-hand side air deflector element 15 is not oriented precisely in the longitudinal or X-direction, but stands somewhat towards the lateral center or towards the center in the Y-direction. Swivel angles $\alpha 1$ and $\alpha 2$ are shown in FIG. 12 on main oscillating link 26 and secondary oscillating links 27 the right-hand rear door 8.

The spring devices 68, for example gas-filled telescopic struts 68 (for the sake of clarity drawn in only in some Figures), may be formed, in the case of the left-hand side spoiler device 9, for example, between the rear door 6 and the side air deflector element 15, or preferably incorporating the oscillating links 16 and 17; thus for the left-hand side spoiler device 9, for example, a spring device 68 may be provided between the main oscillating link 16 and its front joint 16a or the bearing support of the front joint 16a to be fixed to the door, with corresponding provision also for the other spoiler devices 10, 11, 12.

Starting from FIG. 1, the spring device 68 first acts in opposition to the adjusting movement and assists the user in the final phase of the adjustment, so that only the basic position and the drive position can be set, not the intermediate positions.

Figure 10:
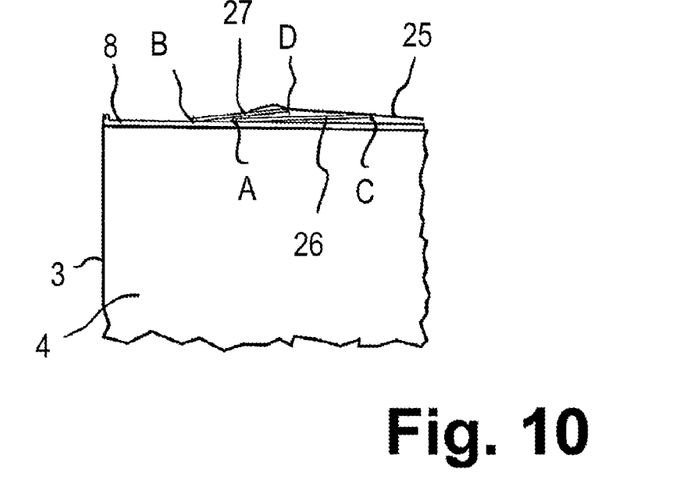
FIG. 10 shows a top view of the basic position of the right-hand side deflector surface.

As an alternative to the embodiment described above the main oscillating link 16 and the secondary oscillating links 17 may also partially come to rest on one another in the basic position, as is shown by reference to the right-hand side spoiler device 10 in the top view in FIG. 10.

The right-hand side spoiler device 10 is formed in a manner corresponding to the left-hand side spoiler device 9, that is to say in the Figures correspondingly symmetrical or laterally inverted in relation thereto, with a right-hand side air deflector element 25, a right-hand main oscillating link 26 of first length L, a front joint 26a and a rear joint 26b, and two secondary oscillating links 27, each having a front joint 27a and rear joint 27b, the front joints 27a of the two secondary oscillating links 27 aligning and the rear joints 27b of the two secondary oscillating links 27 aligning correspondingly.

The left-hand roof spoiler device 11 is in turn correspondingly pivotally attached via a four-bar linkage 38 to the left-hand rear door 6, with a main oscillating link 36 of a third length L3 and at least one secondary oscillating link 37 of a fourth length L4, where L3>L4. In the embodiment shown the four-bar linkage 38 is again provided by a main oscillating link 36 and two pivotally aligning, parallel secondary oscillating links 37, so that a four-bar linkage 38 is again formed corresponding to the four-bar linkages 18 and 28 of the side spoiler devices 9 and 10, resulting in a positive guidance of the left-hand roof air deflector element 35 from the basic position in FIGS. 1 to 4 into the drive position in FIGS. 5 to 9. The arrangement of the front joints 36a and 37a of the main oscillating link 36 and the secondary oscillating link 37 and the lengths L3 and L4 may be selected in such a way that a desired erection angle of the left-hand roof air deflector element 35 is achieved.

The right-hand roof spoiler device 12 is correspondingly formed with a right-hand roof air deflector element 46, a right-hand roof main oscillating link 46 and two right-hand roof secondary oscillating links 47, having the same geometric formation corresponding to the left-hand roof spoiler device 11, that is to say of the same lengths L3 and L4, the front joints 36a and 46a, and 37a and 47a here advantageously aligning, and the rear joints 36b and 46b, and 37b and 47b, correspondingly aligning also in the drive position.

Figure 4:
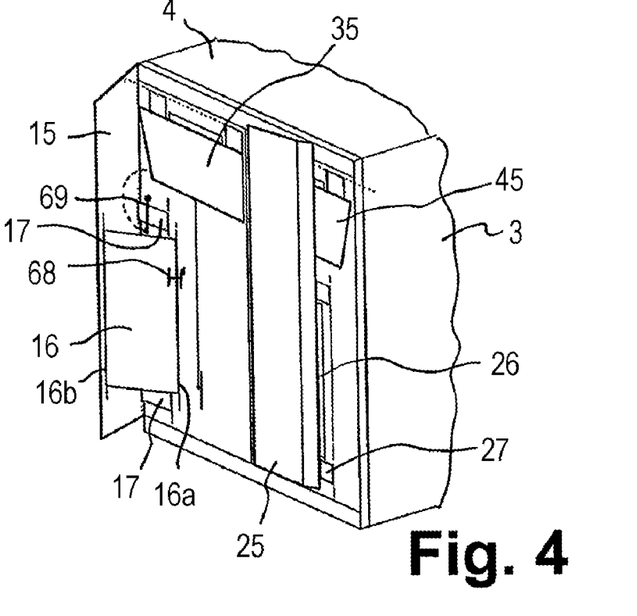
Figure 5:
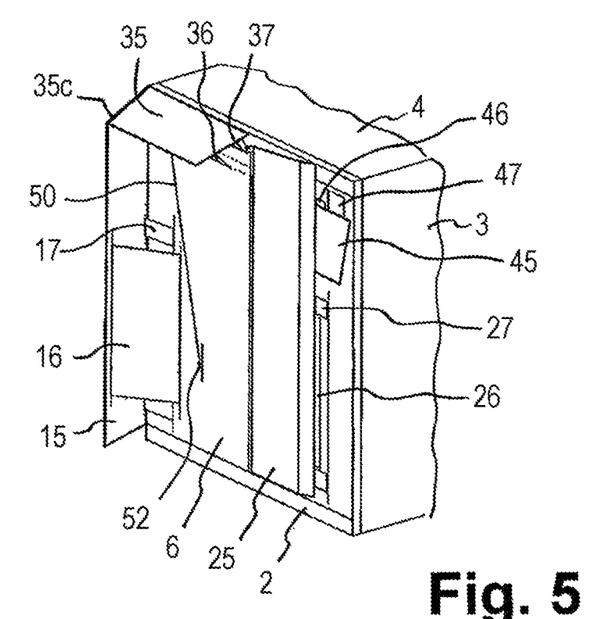
FIG. 5 shows the rear area of the vehicle with the left-hand side deflector surface and roof deflector surface fully erected.
Figure 6:
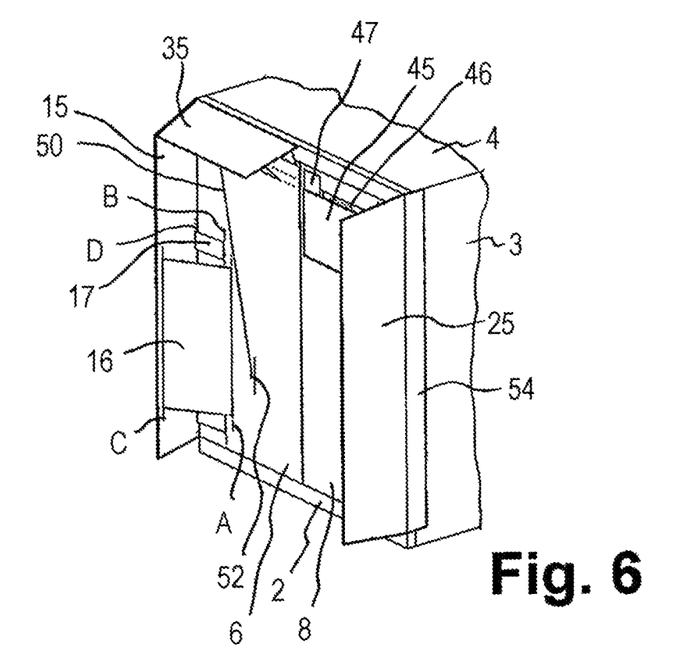
FIG. 6 shows a representation corresponding to FIG. 5 with the right-hand side deflector surface fully erected.

The left-hand side spoiler device 9 is arrested in the drive position either by a shifting bolt or another arresting mechanism 69, such as the arresting mechanism 69 of the secondary oscillating link 17 indicated in FIG. 4, for example, since in the drive position this rests flat on the rear door 6 and the arresting mechanism 69 can therefore be fitted as shackle to the rear door 6, for example as a further component or together with the front joint 17a of the secondary oscillating link 17; this is also correspondingly possible in the case of the right-hand side spoiler device 10. The arresting mechanism 71 for the drive position may also be mounted on the rear door 6 together with the front joint 17a or its bearing support, so as to facilitate fitting.

The left-hand side spoiler device 9 may furthermore also be arrested in its deployed position by the left-hand roof air deflector element 35, so that this rests with its right-hand edge 35c, for example, on the inside or the upper edge of the left-hand side air deflector element 15, and therefore locks its inward swiveling movement.

The left-hand roof spoiler device 11 is again advantageously arrested by additional mechanical arresting means, for example an operating rod 50, which is first used for folding up the left-hand roof air deflector element 35 and after folding up is locked to the rear door 6 in a locking device 52, advantageously at a suitable angle to the left-hand rear door 6, in order to ensure a stable triangular formation.

On each rear door 6, 8, therefore, the respective side spoiler device 9 or 10 is first adjusted from the basic position into the drive position, which can be done manually by the user, for example the driver, by swiveling back the left-hand side air deflector element 15 or the right-hand side air deflector element 25, since this is positively guided by the respective four-bar linkage 18 or 28 and can therefore be swiveled effortlessly into the respective drive position, advantageously assisted by the spring device in the final phase of the swiveling movement. Locking can then ensue by shifting the arresting mechanism 69.

The user then grasps the operating rod 50 and folds the respective roof air deflector element 35 or 45 upwards into its opened drive position, in which it arrests the respective side air deflector element 15 or 25 in its drive position, and locks the push rod 50 or 60 in an arresting mechanism 52 or 62. The roof spoiler devices 11 and 12 can also be spring tensioned by spring devices; an embodiment with no spring action is also possible here, however, so as not make the initial adjustment under the weight even more difficult, the drive position in any case being fixed by the arresting mechanism.

Figure 7:
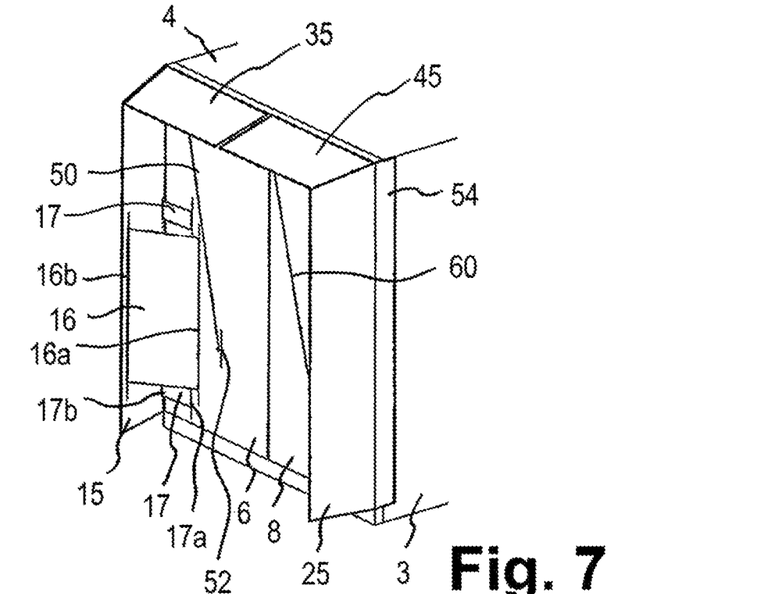
FIG. 7 shows the rear area of the vehicle in the drive position.

According to the embodiment in FIG. 7 the side air deflector elements 15 and 25 comprise deflector surface extensions 54, which project forwards in the X-direction over the rear doors 6 and 8, in order to cover a gap 55 between them and the side walls 3 of the vehicle 1. The deflector surface extensions 54 may therefore rest laterally, for example, on the vehicle structure 2 or the side walls 3. The four-bar linkages 18 and 28 here allow a suitable swiveling movement, in which the deflector surface extensions 54 in the final phase do not impinge on the rear doors 6, 8 or the vehicle structure 2.

Figure 8:
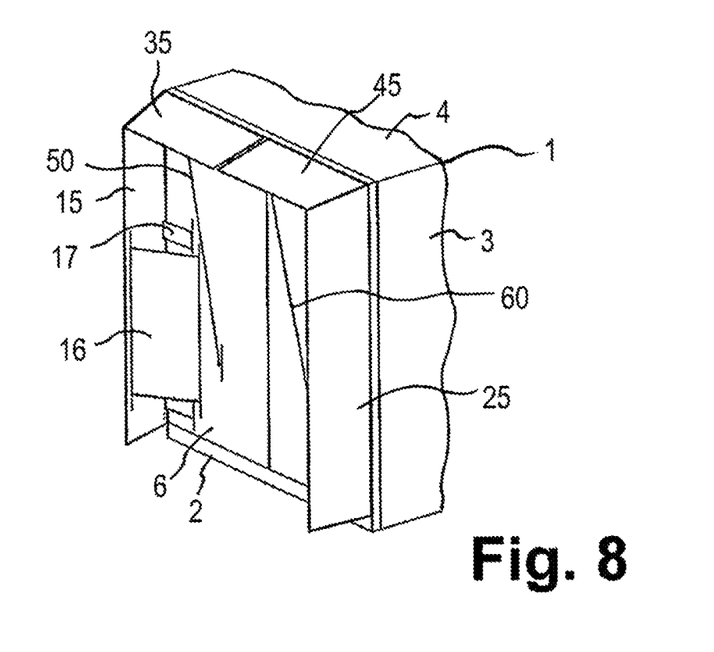
FIG. 8 shows a further embodiment of a rear device in the drive position with no deflector surface extension.
Figure 9:
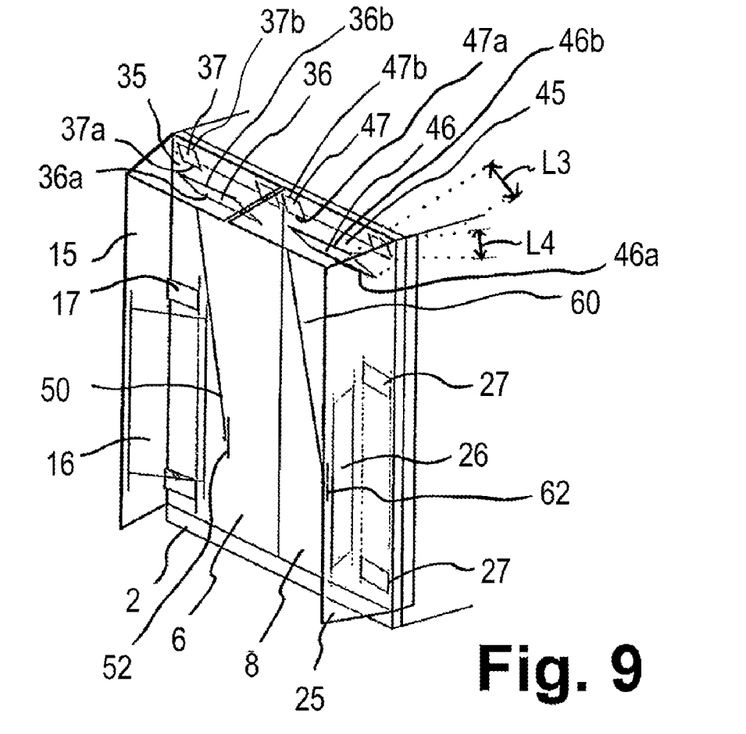
FIG. 9 shows a representation corresponding to FIG. 7 looking through the deflector surfaces or with these in transparent form.
Figure 13:
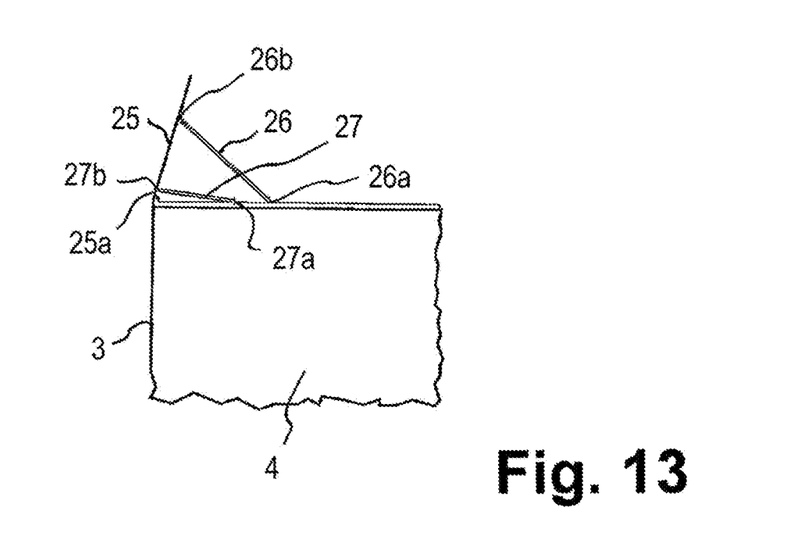
FIG. 13 shows a representation corresponding to FIG. 12 in the embodiment without a deflector surface extension according to FIG. 8.

FIG. 8 shows a corresponding embodiment without such deflector surface extensions 54, so that in a longitudinal direction (X-direction) the front ends 15a and 25a of the side air deflector elements 15 and 25 lie substantially on the same level as the front joints 16a, 17a, 26a, 27a, 36a, 37a, 46a, 47a. FIG. 13 shows a top view of this embodiment, that is to say without deflector surface extensions 54.

Figure 11:
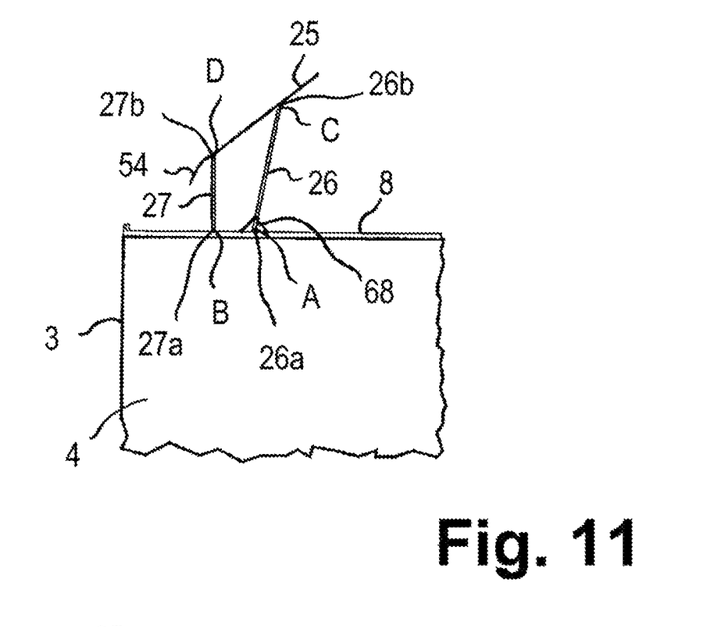
FIG. 11 shows a top view of the first intermediate position of the right-hand side deflector surface according to FIG. 2.

FIGS. 11 and 12 show a top view of the opening operation according to FIGS. 2, 3.

All deflector elements 15, 25, 35, 45 may be of plane or flat design or also curved. The erection angle results from the geometry of the deflector elements 15, 25, 35, 45 and the oscillating links 16, 17, or correspondingly 26, 27, 36, 37, 46, 47, as can also be seen, in particular, from the top view in FIGS. 12 and 13. In principle, therefore, the erection angles may be to any design.

Figure 14:
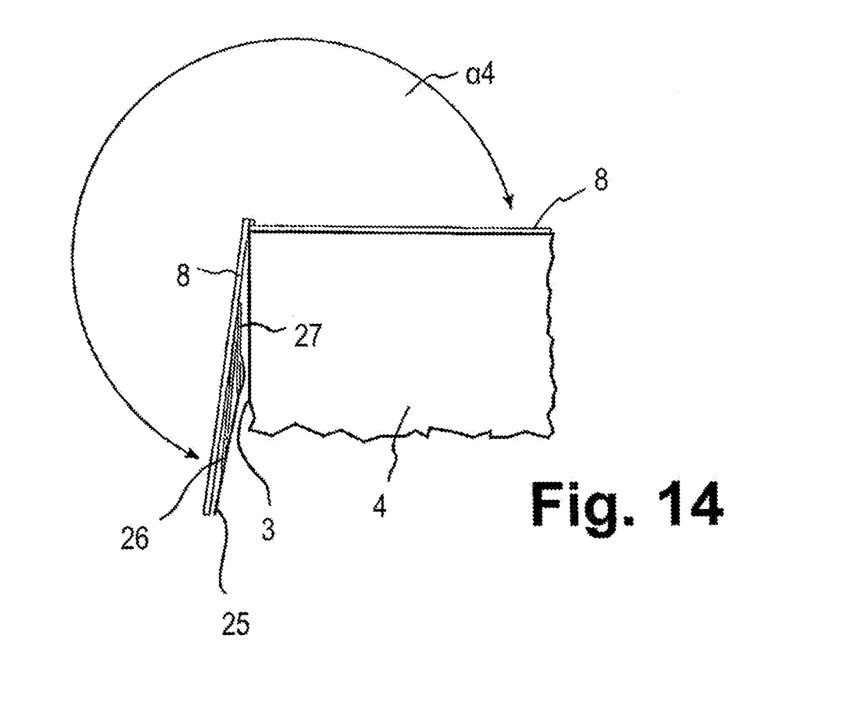
FIG. 14 shows a top view of the right-hand rear area of the vehicle, in the basic position with rear door folded forwards.

Starting from the basic position in FIG. 1, two rear doors 6 and 8 may be swiveled fully open and forwards, as can be seen from the top view in FIG. 14. A conventional opening with an opening angle α4 of 270° or virtually 270° is therefore possible. The entire rear spoiler device 14 or according to FIG. 14 the right-hand side spoiler device 10 and the right-hand roof spoiler device 12 are here folded and therefore lie flat, so that they can be accommodated between the opening rear door 8 and the side wall 3, without substantially impeding the opening operation or adversely affecting opening angle.

All deflector elements 15, 25, 35, 45 can be cost-effectively formed from plastic. The oscillating links 16, 17, 26, 27, 36, 37, 46, 47 may be formed from any material, for example from metal, in order to afford a high degree of stability.

While the above description constitutes the preferred embodiments of the present invention, it will be appreciated that the invention is susceptible to modification, variation and change without departing from the proper scope and fair meaning of the accompanying claims.

The invention claimed is:

1. A rear spoiler device (14) for a vehicle (1) having at least one pivoted rear door (6, 8), the rear spoiler device (14) comprising:
   at least one air deflector element (15, 25, 35, 45), which is adjustable between a basic position and a drive position for extending the contour and aerodynamic air deflection, and
   at least one support device (18, 28, 38, 48) for supporting the air deflector element (15, 25, 35, 45) in the drive position,
   wherein the at least one support device includes a four-bar linkage (18, 28, 38, 48) having at least four joint axes (A, B, C, D) for adjusting the air deflector element (15, 25, 35, 45) between the basic position and the drive position, the four-bar linkage (18, 28, 38, 48) including:
      at least one main oscillating link (16, 26, 36, 46) of greater length (L1, L3) and at least one secondary oscillating link (17, 27, 37, 47) of a smaller length (L2, L4),
      wherein the main oscillating link (16, 26, 36, 46) and the secondary oscillating link (17, 27, 37, 47) each include a front joint (16a, 17a, 26a, 27a, 36a, 37a, 46a, 47a) for attachment to the rear door (6, 8) and a rear joint (16b, 17b, 26b, 27b, 36b, 37b, 46b, 47b), which serves for pivotally connecting the main oscillating link (16) and the secondary oscillating link (17) respectively to the air deflector element (15, 25, 35, 45),
   wherein the rear spoiler device is configured to be mounted exclusively to the at least one rear door (6, 8).

2. The rear spoiler device (14) as claimed in claim 1, wherein the four-bar linkage (18, 28, 38, 48) comprises precisely four joint axes (A, B, C, D).

3. The rear spoiler device (14) as claimed in claim 1, wherein the four joint axes (A, B, C, D) in which the air deflector element (15, 25, 35, 45) is adjustable run parallel to one another.

4. The rear spoiler device (14) as claimed in claim 1, wherein the four-bar linkage (18, 28, 38, 48) forms a positive guidance for adjusting the air deflector element (15, 25, 35, 45) between the basic position and the drive position.

5. The rear spoiler device (14) as claimed in claim 1, wherein the front joint (17a, 27a, 37a, 47a) of the secondary oscillating link (17, 27, 37, 47) is attached to the rear door (6, 8) further outwards towards a side wall (3) or the roof (4) of the vehicle (1) than the front joint (16a, 26a, 36a, 46a) of the main oscillating link (16, 26, 36, 46).

6. The rear spoiler device (14) as claimed in claim 1, wherein in the basic position the rear joint (17b, 27b, 37b, 47b) of the secondary oscillating link (17, 27, 37, 47) is attached to the air deflector element (15, 25, 35, 45) further laterally outwards than the rear joint (16b, 26b, 36b, 46b) of the main oscillating link (16, 26, 36, 46).

7. The rear spoiler device (14) as claimed in claim 1, wherein a first swivel angle ($\alpha 1$) of the main oscillating link (16, 26, 36, 46) is smaller than a second swivel angle ($\alpha 2$) of the secondary oscillating link (17, 27, 37, 47).

8. The rear spoiler device (14) as claimed in claim 1, wherein in the basic position the air deflector element (15, 25, 35, 45) rests flat on the secondary oscillating link (17, 27, 37, 47) and the main oscillating link (16, 26, 36, 46) and substantially parallel to the rear door (6, 8) and in the drive position protrudes from the rear door (6, 8) at a drive position angle ($\alpha 3$), which is greater than 0° and less than 90°.

9. The rear spoiler device (14) as claimed in claim 1, further comprising two secondary oscillating links (17, 27, 37, 47) having front joints (17a, 27a, 37a, 47a) lying in a common joint axis (B) and rear joints (17b, 27b, 37b, 47b) lying in a common joint axis (D), and a main oscillating link (16) arranged between the secondary oscillating links (17), in order to rest with no overlap on the rear door (6, 8) in the basic position.

10. The rear spoiler device (14) as claimed in claim 1, wherein the air deflector element (15, 25) has a front end (15a, 25a) with a contour extension (54), which in the drive position extends over a vehicle structure (2) of a rear area or up to a side wall (3) of the vehicle (1) and bridges an intermediate gap.

11. The rear spoiler device (14) as claimed in claim 1, further comprising a side air deflector element (15, 25), having vertically running joint axes (A, B, C, D), for extending a contour of a side wall (3) of the vehicle (1).

12. The rear spoiler device (14) as claimed in claim 1, further comprising a roof air deflector element (35, 45), having horizontally running joint axes, for extending the contour of a roof (4) of the vehicle (1).

13. The rear spoiler device (14) as claimed in claim 1, further comprising arresting mechanisms (71, 69, 52, 62) for at least one of the basic position and the drive position, the arresting mechanisms being mounted to the at least one rear door (6, 8).

14. The rear spoiler device (14) as claimed in claim 1, further comprising at least one spring device (68), which pushes the at least one air deflector element (15, 25, 35, 45) into the basic position in a first swivel range and into the drive position in a second swivel range.

15. The rear spoiler device (14) as claimed in claim 1, comprising a left-hand side spoiler device (9) and left-hand roof spoiler device (11) for attachment to a left-hand rear door (6) of the vehicle (1) and a right-hand side spoiler device (10) and right-hand roof spoiler device (12) for attachment to a right-hand rear door (8) of the vehicle (1),
   wherein the rear spoiler device (14) in the basic position with the left-hand and right-hand rear doors (6, 8) swiveled forwards and resting on side walls (3) of the vehicle (1) is accommodated between the left-hand and right-hand rear doors (6, 8) and the side walls (3).

16. A vehicle (1) having a rear spoiler device (14) as claimed in claim 15, wherein the vehicle (1) comprises two pivoted rear doors (6, 8), which can be opened by more than 180° forwards,
   wherein the rear spoiler device (14) is attached only to the rear doors (6, 8), and
   in the basic position of the rear spoiler device (14) the rear doors (6, 8) can be fixed to the sidewalls (3) of the vehicle (1), wherein the rear spoiler device (14) can be accommodated between the sidewalls (3) and the rear doors (6, 8).

17. The rear spoiler device (14) as claimed in claim 14, wherein the spring device is installed in a bistable arrangement having a dead-point position between the first swivel range and second swivel range.

* * * * *